United States Patent [19]

O'Connor

[11] 3,924,881
[45] Dec. 9, 1975

[54] INJECTION MOLDED PLASTIC PIPE FITTING
[75] Inventor: John Vincent O'Connor, Englewood, Colo.
[73] Assignee: Johns-Manville Corporation, Denver, Colo.
[22] Filed: Jan. 22, 1975
[21] Appl. No.: 542,979

[52] U.S. Cl. ........... 285/156; 277/DIG. 2; 285/345; 285/379; 285/423; 285/DIG. 22
[51] Int. Cl.² .................... F16L 21/02; F16L 47/00
[58] Field of Search ............ 285/DIG. 22, 379, 345, 285/156, 423, 115, 230, 231; 277/DIG. 2, DIG. 3, 207 R

[56] References Cited
UNITED STATES PATENTS

| 3,260,540 | 7/1966  | Houot      | 285/423 X    |
| 3,544,119 | 12/1970 | Glover     | 285/379 X    |
| 3,645,547 | 2/1972  | Glover     | 285/DIG. 22  |
| 3,827,734 | 8/1974  | Brown      | 285/379      |
| 3,857,589 | 12/1974 | Oostenbrink| 285/379 X    |

FOREIGN PATENTS OR APPLICATIONS

| 1,473,122 | 2/1967  | France         | 285/DIG. 22 |
| 1,210,832 | 11/1970 | United Kingdom | 285/345     |
| 109,690   | 10/1966 | Norway         | 285/379     |

Primary Examiner—Thomas F. Callaghan
Attorney, Agent, or Firm—Robert M. Krone; Stephen C. Shear

[57] ABSTRACT

The female member of a pipe joint, particularly one which comprises part of an injection molded fitting, is disclosed herein. This member includes an axially extending hollow section, for example one section of the fitting, and a circumferential sealing gasket disposed concentrically within the hollow section. In addition, this female member includes an integral, injection molded plastic gasket retaining element which is provided for securely maintaining the sealing gasket in place within the hollow section just recited. This gasket retaining element is specifically designed for use in high pressure pipe joint applications.

3 Claims, 6 Drawing Figures

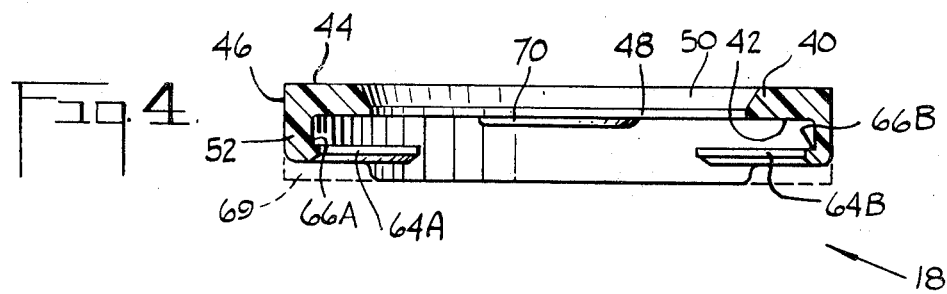
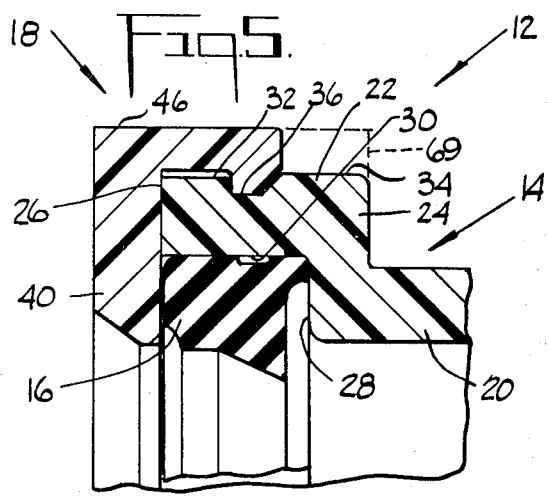
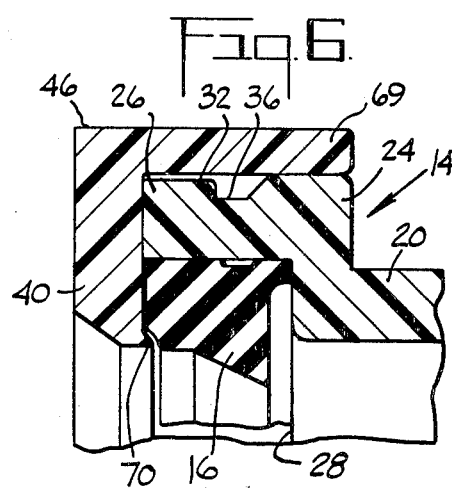

INJECTION MOLDED PLASTIC PIPE FITTING

BACKGROUND OF THE INVENTION

The present invention relates generally to pipe joints and more particularly to a high pressure pipe fitting constructed of plastic and manufactured by means of injection molding.

The type of fitting to which the present invention is directed is one which is constructed of plastic and made by means of injection molding. The fitting of this general type includes a fitting body of integral, injection molded plastic having two or more axially extending sections which, at their free ends, define openings for receiving therein adjacent ends of the pipes to be connected together by the fitting. A circumferential sealing gasket is disposed concentrically within each of these sections against an axially inward shoulder located within the section. To secure the gaskets in place, the overall fitting includes gaskets retainer rings which are also integrally constructed of plastic and made by means of injection molding. These retainer rings are interlocked to the free ends of the gasket containing sections of the fitting such that the sealing gaskets within the axially extending sections are held in place between the retainer rings and axially inward shoulders.

A fitting of the general type just described can be used in a number of different applications including, for example, connecting together pressure pipe. When used in pressure service, particularly high pressure service where the pressures within the fitting can reach to levels in excess of 600, it is critical that the joints of the fitting be designed to withstand such high pressure. If cost is of no great consequence this could be readily accomplished. For example, the fitting could be overdesigned with extra thick walls. However, where cost is a significant consideration the ability to design a reliable high pressure fitting joint of injection molded plastic becomes more difficult. However, as will be seen hereinafter, the fitting of the present invention is one which can be economically manufactured by means of injection molding and one which is reliable in use, especially in high pressure applications.

BRIEF SUMMARY OF THE INVENTION

An object of the present invention is to provide the female member of a pipe joint, specifically a pipe fitting, which is constructed of plastic and readily made by means of injection molding.

Another object of the present invention is to provide a female member which utilizes a circumferential sealing gasket, reliably held in place, for seal connecting the female member, for example the fitting, to a cooperating male member, for example one end of a pipe to be connected to the fitting.

Still another object of the present invention is to provide a female member which is specially suitable for use in high pressure service.

A female member of a pipe joint, specifically a pipe fitting in the preferred embodiment, is disclosed herein and includes an axially extending hollow section having an external surface, an internal surface and a free end defining an opening into the section to provide entry for the male member of the pipe joint. This axially extending hollow section includes two distinct shoulder means, preferably circumferential shoulders. An outwardly directed shoulder means is connected with the external surface of the hollow section, spaced a predetermined distance from its free end and faces away from the free end. An inwardly directed internal shoulder means is connected with the internal surface of the hollow section, spaced a predetermined distance from and faces the hollow sections free end. A circumferential sealing gasket is disposed concentrically within the hollow section between its free end and its internal shoulder means to provide sealing means for the pipe joint. The gasket has one side adjacent the internal shoulder means and its opposite side facing the free end of the hollow section.

The female member also includes an integral, injection molded plastic gasket retaining element provided for holding the sealing gasket in place within the axially extending hollow section. This gasket retaining element includes a ring-shaped gasket securing segment which is positioned adjacent the free end of the axially extending hollow section and which includes a circumferential surface in confronting relationship with the side of the gasket facing the free end of this hollow section, thereby maintaining the gasket in its concentrically disposed position within the hollow section. The gasket retaining element also includes an axially extending ring-shape flange segment joined at one end with the gasket securing segment at approximately the free end of the hollow section. This flange segment extends over and concentrically around a portion of the hollow section from the free end of the latter towards the outwardly directed external shoulder means of the latter.

In accordance with the present invention, two circumferentially spaced, axially extending portions of the flange segment just described, spaced on opposite sides of the axis of the flange segment, terminate at first edges located approximately directly above or above and slightly beyond the external shoulder means of the previously described hollow section. These axially extending portions are joined together by two different circumferentially spaced, axially extending portions of the flange segment, the second portions being located between the first mentioned axially extending portions. Unlike the first mentioned portions, these second axially extending portions terminate at second edges a predetermined substantial distance past the first terminating edges. Two internal shoulder means are connected with the internal surface of the flange segment, extend circumferentially along or just inwardly of the first terminating edges of the first mentioned axially extending portions and are spaced from one another by the second mentioned axially extending portions. These two shoulder means face the free end of the hollow section in confronting engagement with the external shoulder means of the latter, whereby to prevent free separation between the gasket retaining element and the axially extending hollow section.

As just stated, the ring-shaped flange segment of the gasket retaining element includes four circumferentially spaced, axially extending portions, two of which extend beyond the terminating edges of the other two and beyond the engaging shoulder means which prevent free separation between the gasket retaining element and axially extending hollow section. It has been found that these "extensions" in the axially longer portions of the flange segment allow the overall female member to be used reliably in high pressure applications without the necessity of over designing the entire pipe joint.

Where the female member described above comprises part of a fitting, the fitting will include more than one such female member, for example in a coupling, two such members will be provided and in a wye connection, tee connection, or the like, three such members will be utilized. In this regard, the term "fitting" used herein is intended to include couplings as well as wye fittings, tee fittings and the like.

BRIEF DESCRIPTION OF THE DRAWINGS

FIG. 4 is a cross-sectional view of the gasket retaining element of FIGS. 2 and 3, taken in generally along line 4—4 in FIG. 3.

FIG. 5 is a sectional view of a portion of the fitting of FIG. 1, taken generally along line 5—5 in FIG. 1.

FIG. 6 is a sectional view of a portion of the fitting of FIG. 1, taken generally along the line 6—6 in FIG. 1.

DETAILED DESCRIPTION AND PREFERRED EMBODIMENTS

Figure 1:
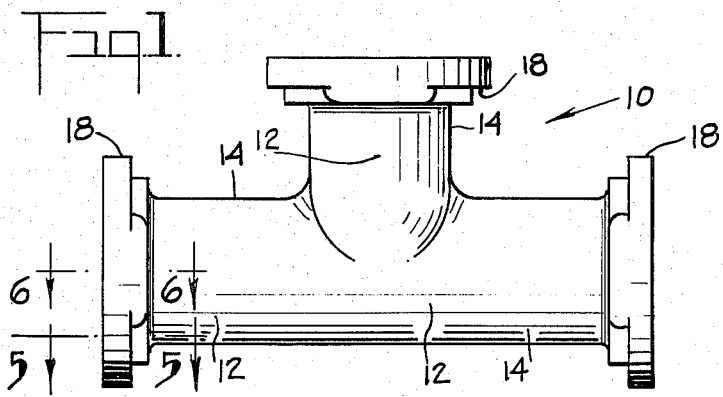
FIG. 1 is a plan view of an injection molded, plastic fitting, specifically a tee fitting, constructed in accordance with the present invention.

Turning to the drawings, wherein like components are designated by like reference numerals throughout the various figures, a fitting, particularly a tee fitting, constructed in accordance with the present invention, is specifically illustrated in FIG. 1 and designated by the reference numeral 10. Fitting 10 is comprised of three substantially identical sections 12 which join together the adjacent ends of three pipes (not shown). Each section 12 functions as a female member of the joint connecting an associated pipe with the fitting. As will be seen below, each of these female members, i.e., sections 12, is constructed of plastic, manufactured by means of injection molding and, in accordance with the present invention, designed such that the overall fitting 10 can be reliably used in high pressure applications. Each member 12 includes a main body 14 which is integral with the other main bodies 14 of the fitting, an annular sealing gasket 16 (see FIGS. 5 and 6) disposed concentrically within the main body and a gasket retaining element 18 which, as will also be seen, is constructed in accordance with the present invention.

Turning to FIGS. 5 and 6, attention is specifically directed to the main body 14 of one of the female members or sections 12 of fitting 10. As illustrated in this figure, main body 14 includes an axially extending, hollow section 20 which merges with a larger, coaxial hollow section 22, also axially extending, by means of an integral radially extending flange section 24. As best seen in FIG. 5, section 22 joins section 20 by means of flange section 24 at one end. Its other end, designated by the reference numeral 26, is free so as to define an opening into the female member to provide entry for a corresponding male member of the overall joint, i.e., the adjacent end of an associated pipe to be connected to the fitting.

Female member 12 includes two specific shoulder means associated with section 14. One such means is an internal, annular shouldered surface 28 which extends radially inwardly from the internal surface 30 of axially extending section 22 and which is spaced a predetermined distance from and faces the free end of this section. This inwardly directed shouldered surface, which actually comprises one side of annular flanged section 24, is provided to aid in securing gasket 16 in place concentrically within section 22 of the female member, as will be seen. The second shoulder means just referred to is comprised of an annular, external shoulder 32 which extends inwardly from the external surface 34 of section 22, which is spaced a predetermined distance from the free end of the latter, between the free end and flanged section 24, and which faces away from the free end section 22. External shoulder 32, which actually comprises one side of an annular recess 36 circumscribing the external surface 34 of section 22, is provided to aid in innerlocking an associated gasket retaining element 18 with section 22, as will also be seen.

As stated previously, annular sealing gasket 16 is concentrically disposed within body 14 of female member 12. Actually, gasket 16 is concentrically disposed within section 22 of body 14 such that one side of the gasket engages against shoulder 28 and such that its other side is disposed at approximately the free end of section 22. The outer circumferential surface of gasket 16 engages against the internal surface 30 of section 22 and the innermost circumference of the gasket is disposed radially inwardly of the internal surface of section 20 so as to seal engage against a pipe end, i.e., the male member of the joint, to be inserted within female member 12. As will be seen below, gasket retaining element 18 is provided for maintaining the gasket in this position.

Figure 2:
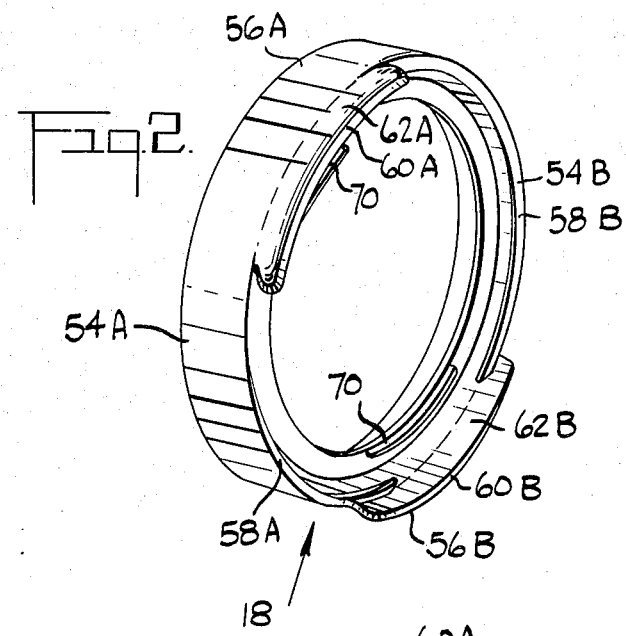
FIG. 2 is a perspective view of one gasket retaining element which is constructed in accordance with the present invention and which comprises part of the fitting of FIG. 1.
Figure 3:
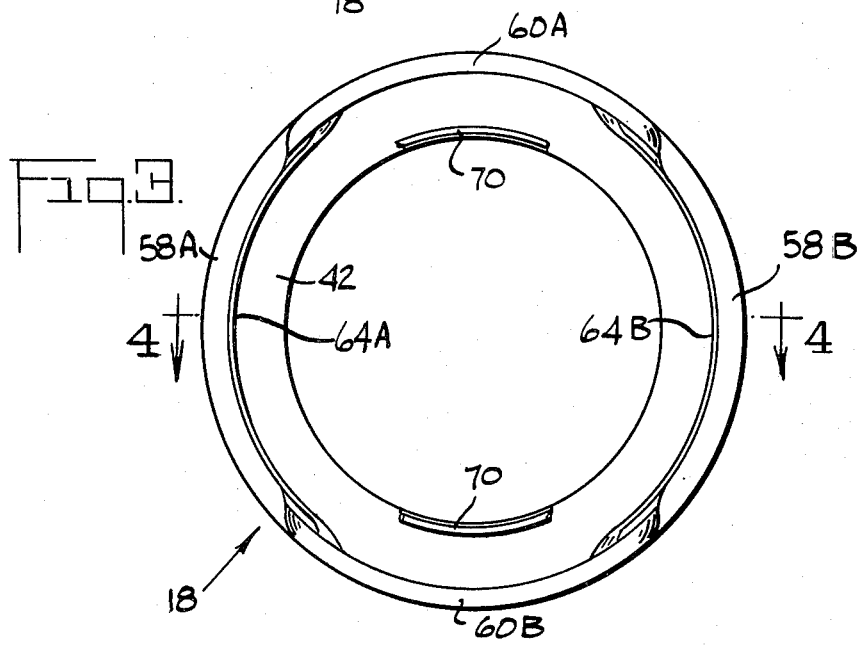
FIG. 3 is an end view, in elevation, of the gasket retaining element of FIG. 2.

Turning to FIGS. 2, 3 and 5, attention is directed to gasket retaining element 18 which is constructed of plastic and integrally molded by, for example, a conventional injection molding process. Gasket retaining element 18 includes a ring-shaped gasket securing segment 40 having opposite side surfaces 42 and 44, an external surface 46 and an internal surface 48. As will be seen, ring-shaped segment 40 is positioned adjacent, actually against, the free end 26 of axially extending section 22, as best seen in FIGS. 5 and 6. In this way, a circumferential portion of side surface 42 is in confronting relationship with, actually engaged against, the otherwise free side of gasket 16 to maintain the gasket in its concentrically disposed position within section 22. The other side surface 44 of segment 40, of course, faces away from gasket 16. In this regard, the internal surface 48 of segment 40 may include a circumferential, outwardly extending and outwardly facing beveled surface 50 to aid in inserting the male member of the overall joint, i.e., the associated pipe end, within female member 12.

Gasket retaining element 18 also includes a ring-shaped flange segment 52 which is joined with the gasket securing segment 40 at one end and which extends therefrom in an axial direction over and concentrically around a portion of axially extending section 22 in a direction towards annular flange 24, as seen in FIGS. 5 and 6. In accordance with the present invention, flange segment 52 is divided into four circumferentially spaced, axially extending portions generally designated by the reference numerals 54A and B and 56A and B. Note that the portions 54A and 54B of flange segment 52, which are approximately equal in circumference, together comprise slightly more than half of the overall circumference of the flange segment and lie on opposite sides of the segment's axis. Note that portions 56A and 56B, which join portions 54A and B together and which are also approximately equal in circumference, comprise slightly less than one-half of the overall circumference of the segment and also lie on opposite sides of the segment's axis. It should still further be noted, as best seen in FIG. 2 and FIG. 5, that portions 54A and 54B, extending from gaskets securing segment 40, terminate at edges 58A and B which are located approximately directly above circumferential recess 36 in hollow section 22 or just slightly beyond the recess. However, as best seen in FIGS. 2 and 6, the portions 56A and 56B, extending from gasket securing segment 40, terminate at edges 60A and B located a predetermined distance past edges 58A and 58B, i.e., a predetermined distance past recess 36. In the preferred embodiment illustrated, terminating edges 60A and 60B lie directly over and flush with the external surface of annular flange 24 connecting sections 20 and 22 together, as best seen in FIG. 6.

With portions 56A and 56B of flange segment 52 extending a greater distance from its end joining segment 40 than portions 54A and 54B, the overall flange segment is provided with what may be referred to as circumferentially discontinuous extensions which, with the aid of dotted lines in FIG. 2, are clearly shown. As will be seen hereinafter, it has been found that these extensions, which are generally designated by the reference numerals 62A and 62B unexpectedly provide the overall joint with the ability to reliably withstand extremely high internal pressures without failing and without the necessity of "overdesigning" the joint.

As just stated two distinct, spaced extensions 62A and 62B comprise part of flange segment 52. While this is preferred, it is to be understood that a single, continuous extension of the overall flange segment (including portions 62A and 62B) could be readily provided. A full extension is indicated by the dotted line 69 in FIG. 5. In any event, whether the extension is a single continuous one or two separate extensions 62A and 62B, the extension or extensions provide reinforcing means for the overall gasket retaining element 18. However, by using only partial extensions, i.e., spaced extensions 62A and 62B which extend axially away from ribs 64A and 64B from the circumferential spaces between ribs 64A and 64B such that the ribs are located at terminating edges 58A and 58B, a large amount of plastic material is saved without much decrease in reinforcement.

In addition to ring-shaped gasket securing segment 40 and axially extending ring-shaped flange segment 52, the plastic gasket retaining element 18 includes two discontinuous ribs 64A and 64B. Rib 64A extends circumferentially along the terminating edge 58A of portion 54A and depends radially inwardly therefrom. In a similar fashion, the rib 64B extends circumferentially along the terminating edge 58B of portion 54B and depends radially inwardly therefrom. Each of the ribs 64A and 64B include an inwardly directed shouldered surface 66A and 66B, respectively, which is spaced from and confronts the gasket retaining segment 40, as best seen in FIG. 5. As best seen in FIG. 5, each of these ribs is constructed to snap within previously described recess 34 of axially extending hollow section 22 such that shouldered surfaces 66A and 66B are in confronting engagement with the shouldered surface 32 of the recess. These engaging shouldered surfaces prevent free separation between gasket retaining element 18 and axially extending section 22, thereby holding the gasket 16 in place concentrically with the latter. Note that where flange segment 52 extends slightly beyond recess 36, the ribs 64A and 64B will be located slightly in from terminating edges 58A and 58B. In other words, these ribs are located directly over and concentrically aligned with recess 36, whether or not edges 58A and 58B are located at or slightly beyond recess 36.

It should be specifically noted that ribs 64A and 64B are discrete co-planer members which, while lying in a common plane perpendicular to the axis of flange segment 52, do not join one another to provide a single continuous rib but rather terminate when they reach circumferential portions 56A and 58B of the flanged segment, i.e., at extensions 62A and 62B or approximately at these points. While it would be desirable to provide a single, continuous rib which completely circumscribes the internal surface of flange segment 52 to engage continuously in circumferential recess 36, due to the manner in which the gasket retaining element is made, this is not practical. More specifically, as stated previously element 18 is manufactured by means of an injection molding process. This process, which may be conventional, utilizes outer mold means which are responsible for forming the external shape of element 18 and internal mold means which are responsible for forming the inner surfaces of the element. In actually molding the gasket retaining element, if rib 64A and 64B were only parts of a single continuous rib it would be difficult to remove the inner mold means from within the formed element due to formation of a continuous rib. By providing two distinct ribs with spaces therebetween, the inner mold component can be collapsed to a degree sufficient to remove it from between these spaces without requiring it to be collapsed to an even greater degree to remove it from a continuous rib.

In addition to the foregoing, gasket retaining element 18 may include one or more flanges 70 which extend partially around the innermost edge of the surface 42 of ring-shaped segment 40. As seen best in FIG. 6, these flanges 70 extend in a direction away from the surface 42 and into axially extending section 22 just under a portion of gasket 16 so as to aid in holding the gasket in place. The gasket retainer element 18 has been shown including two such flanges. More than two could be provided or, in fact, a single continuous circumscribing flange could be provided.

Having described one of the female members 12 making up fitting 10, it is to be understood that the other female members may be substantially identical to the one described. It is to be further understood that the present invention is not limited to the specific tee fitting illustrated but may be incorporated as part of any other multi-connection fitting, for example a wye fitting or a two connection fitting such as a coupling. In addition, the particular female member illustrated may comprise one end of a straight pipe. Further, while both the main body and gasket retaining element of each female member are preferably constructed of plastic, specifically polyvinyl chloride, and both are preferably made by means of an injection molded process, it is to be understood that, for the purpose of the present invention, only the gasket retaining element need be made by means of an injection molding process.

To exemplify the present invention, two groups of fittings were provided. One group consisted of fittings constructed in accordance with the preferred embodiment of the present invention. More specifically, each of the fittings of this group including a female joint member similar to that shown in the drawings. The entire distance across the flange segment (52 in the drawing) of the gasket retaining element (18 in the drawing) including the extensions (62) was 0.930 inch. Each of the extensions was 0.270 inch in length. The other group consisted of fittings identical to those in the first group except that the fittings in this second group did not include extensions (62).

A standard ASTM (Method D1599) "Quick Burst" test was run on each of the fittings in each group (6–8 samples per group). On the average, those fittings in the second group, i.e., those without extensions, failed (they failed at the ring joint) at between 310 psi and 320 psi. On the other hand, the fittings in the first group, i.e., the ones constructed in accordance with the present invention, on the average, did not fail until they were subjected to approximately 880 psi. In addition, failure was not at the ring joint.

This comparison is not intended to limit the present invention. Rather, it is provided merely to exemplify the advantage achieved by the present invention.

What I claim is:

1. A female member of a pipe joint, comprising:
   a. an axially extending hollow section having an external surface, an internal surface and a free end defining an opening into the section to provide entry for the male member of the pipe joint;
   b. outwardly directed external shoulder means connected with the external surface of said hollow section, spaced a predetermined distance from said free end and facing away from said free end;
   c. inwardly directed internal shoulder means connected with the internal surface of said hollow section, spaced a predetermined distance from and facing said free end;
   d. a circumferential sealing gasket disposed concentrically within said hollow section between said free end and said internal shoulder means to provide sealing means for the pipe joint, said gasket having one side thereof adjacent said internal shoulder means and its opposite side facing said free end;
   e. an integral, injection molded plastic gasket retaining element including
      i. a ring-shaped gasket securing segment positioned adjacent the free end of said hollow section and including a circumferential surface in confronting relationship with said opposite side of said gasket to maintain said gasket in its concentrically disposed position within said hollow section, and
      ii. an axially extending ring-shaped flange segment joined at one end with said gasket securing segment at approximately said free end of said hollow section, said flange segment extending over and concentrically around a portion of said hollow section from said free end and extending at least to said external shoulder means;
   f. two co-planer internal shoulder means connected with and extending circumferentially along the internal surface of said flange segment, adjacent said external shoulder means connected with the external surface of said hollow section, said co-planer shoulder means being spaced from one another by circumferential portions of said flange segment and facing the free end of said hollow section in confronting engagement with said external shoulder means whereby to prevent free separation between said gasket retaining element and said hollow section; and
   g. reinforcing means comprising an axial extension of at least a portion of said flange segment, said extension extending axially past said two co-planer external shoulder means.

2. A female member according to claim 1 wherein said reinforcing means comprises two circumferentially spaced extensions of said flange segments extending axially past said two co-planer shoulder means, said two extensions extending from the circumferential spaces between said co-planer shoulder means and wherein said co-planer shoulder means define terminating edges of said flange segment along the circumferential extent of said co-planer shoulder means.

3. In an injection molded, plastic pipe fitting for connecting together the adjacent ends of at least two pipes, a pipe connecting arrangement associated with each of the pipe ends to be connected, each arrangement comprising:
   a. an axially extending hollow section having an external surface, an internal surface and a free end defining an opening into the section to provide entry for an associated pipe and;
   b. outwardly directed external shoulder means connected with the external surface of said hollow section, spaced a predetermined distance from said free end and facing away from said free end;
   c. inwardly directed internal shoulder means connected with the internal surface of said hollow section, spaced a predetermined distance from and facing said free end;
   d. a circumferential sealing gasket disposed concentrically within said hollow section between said free end and said shoulder means to provide sealing means for the pipe joint, said gasket having one side thereof adjacent said shoulder means and its opposite side facing said free end; and
   e. an integral, injection molded plastic gasket retaining element including
      i. a ring-shaped gasket securing segment positioned adjacent the free end of said hollow section and including a circumferential surface in confronting relationship with said opposite side of said gasket to maintain said gasket in its concentrically disposed position within said hollow section, and
      ii. an axially extending ring-shaped flange segment joined at one end with said gasket securing segment at approximately said free end of said hollow section, said flange segment extending over and concentrically around a portion of said hollow section from said free end;
   f. a first pair of axially extending portions of said flange segment being spaced on opposite sides of the axis of said flange segment and terminating at first edges located approximately directly above said external shoulder means, said axially extending portions being joined together by a second pair of circumferentially spaced, axially extending portions of said flange segment located between said first pair of axially extending portions, said second pair terminating at second edges, a predetermined distance past said external shoulder means and said first edges;
   g. two internal shoulder means connected with the internal surface of said flange segment, extending circumferentially along said first edge terminating edges of said first pair of axially extending portions and being spaced from one another by said second pair of axially extending portions, said two shoulder means facing the free end of said hollow section in confronting engagement with said external shoulder means whereby to prevent free separation between said gasket retaining element and said hollow section.

* * * * *